United States Patent [19]

Deschenes et al.

[11] Patent Number: 6,064,306

[45] Date of Patent: *May 16, 2000

[54] FASTENER ASSEMBLY AND METHOD OF MAKING THE SAME

[75] Inventors: Charles L. Deschenes, North Attleboro; Roger J. Archambault, Blackstone, both of Mass.; Terence J. Jones, Bentleyville, Ohio

[73] Assignee: Avery Dennison Corporation, Pasadena, Calif.

[ * ] Notice: This patent is subject to a terminal disclaimer.

[21] Appl. No.: 09/294,580

[22] Filed: Apr. 20, 1999

Related U.S. Application Data

[63] Continuation of application No. 08/925,117, Sep. 8, 1997, Pat. No. 5,949,336, which is a continuation-in-part of application No. 08/867,348, Jun. 2, 1997.
[60] Provisional application No. 60/037,124, Feb. 3, 1997.
[51] Int. Cl.⁷ .................................................... G08B 13/14
[52] U.S. Cl. ...................................... 340/572.8; 264/297.6
[58] Field of Search ............................. 340/572.8, 572.9, 340/572.1; 264/297.6

[56] References Cited

U.S. PATENT DOCUMENTS

| | | | |
|---|---|---|---|
| 4,899,134 | 2/1990 | Wheeless, Jr. | 340/573.1 |
| 5,631,631 | 5/1997 | Deschenes | 340/572.8 |
| 5,717,382 | 2/1998 | Cooper | 340/572.8 |
| 5,949,336 | 9/1999 | Deschenes et al. | 340/572.8 |

*Primary Examiner*—Thomas Mullen
*Attorney, Agent, or Firm*—Kriegsman & Kriegsman

[57] ABSTRACT

A fastener assembly for use in tagging an article of commerce and in detecting the unauthorized removal of the article from a store or other business establishment. The fastener assembly comprises a plastic fastener comprising an elongated filament having a first end and a second end, a transverse bar disposed at the first end of the elongated filament and a paddle disposed at the second end of the elongated filament. The paddle is shaped to include a recess. The fastener assembly also comprises an electronic article surveillance (EAS) security device which is disposed within the recess of the paddle. A cover is mounted over the recess so as to trap the security device within the paddle. A method of manufacturing the fastener assembly can be accomplished by continuously molding a length of fastener stock to form a plastic fastener having a recess formed therein, disposing a security device within the recess of the plastic fastener and mounting a cover over the recess so as to trap the security device within the fastener.

1 Claim, 5 Drawing Sheets

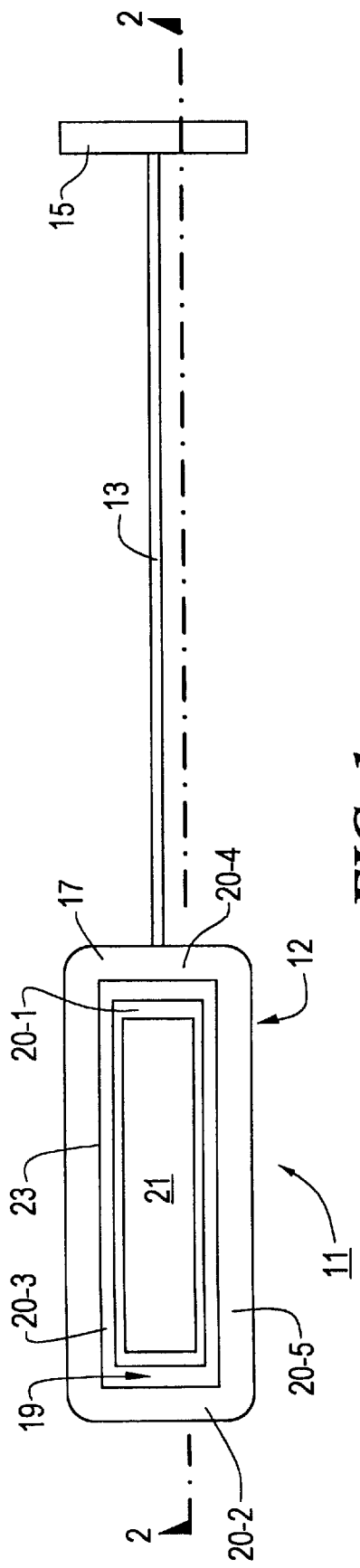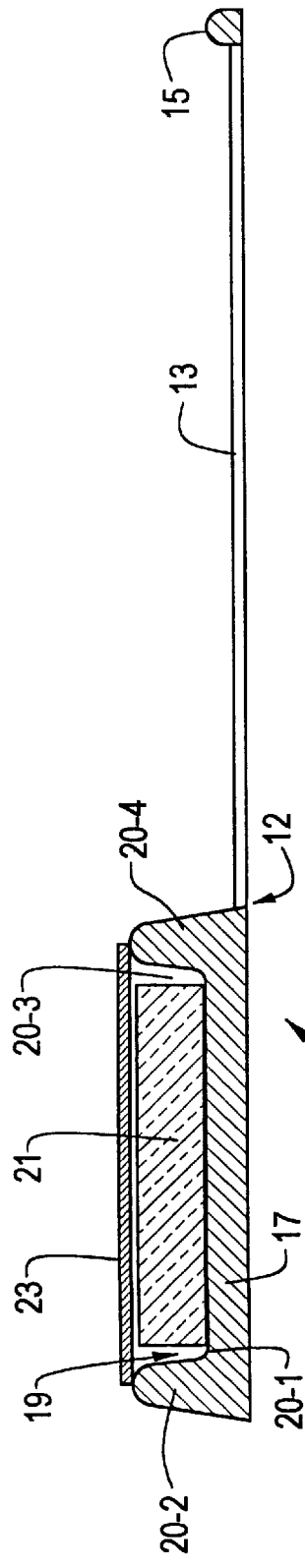
FIG. 1
FIG. 2

FASTENER ASSEMBLY AND METHOD OF MAKING THE SAME

CROSS-REFERENCE TO RELATED APPLICATIONS

This application is a continuation of U.S. Ser. No. 08/925,117 filed on Sep. 8, 1997, now U.S. Pat. No. 5,949,336, which in turn is a continuation-in-part of U.S. Ser. No. 08/867,348 filed on Jun. 2, 1997, which in turn claimed the priority of provisional patent application Ser. No. 60/037,124 filed on Feb. 3, 1997 under 35 USC 119(e).

BACKGROUND OF THE INVENTION

The present invention relates generally to a fastener assembly and more specifically to a fastener assembly which includes a plastic fastener having a cross-bar at one end of an elongated filament.

Plastic fasteners of the type commonly used, for example, to attach merchandise tags to articles of commerce, such as articles of clothing, are well known and are widely used in the retail industry. Typically, such fasteners comprise an elongated member having a first end shaped to define a cross-bar (also commonly referred to as a "T-bar"), a second end and a thin filament portion interconnecting the cross-bar and the second end. In use, the cross-bar is inserted first through a tag and then through a desired piece of fabric. The second end is appropriately sized and shaped to keep the tag from being pulled off the filament portion.

Typically, such fasteners are mass-produced into one of two different forms known as fastener stock. One type of fastener stock comprises a plurality of fasteners joined together at their respective cross-bars by an orthogonally disposed runner bar. The other type of fastener stock comprises a plurality of fasteners arranged in an end-to-end alignment, the ends of successive fasteners being joined together by severable connectors so as to form a length of continuously connected fastener stock.

Both types of fastener stock are commonly mass-produced through a process of continuous molding. As an example of continuous molding, there is disclosed in U.S. Pat. No. 4,461,738 to Russel a method of continuous extrusion molding of objects using a rotatable molding wheel with peripheral orifices in accordance with the objects to be molded. Plastic is extruded upon the periphery of the wheel and a knife in substantially eliptical contact is used to skive film from the objects being molded. Following molding, selected portions of the objects can be selectively distended. Suitable distention can be achieved using diverging sprocket wheels. When the continuously molded objects are fasteners with filament-like portions, the diverging sprocket wheels can be used to stretch the filamentary portions and reorient their molecules.

The dispensing of individual fasteners from fastener stock into desired articles of commerce is typically accomplished using an apparatus commonly referred to as a tagger gun. Typically, a tagger gun includes (a) a hollow needle having a longitudinal slot extending across its length; (b) means for separating an individual cross-bar from the remainder of the fastener stock; and (c) means for feeding the individual cross-bar through the hollow, slotted needle and the desired article of commerce. Connections, if any, between the ends of adjacent fasteners are severed by pulling the tagger gun away from the article of commerce after the cross-bar of one of the fasteners has been inserted thereinto.

Although plastic fasteners of the type described above work well in the attachment of merchandise tags to articles of commerce, it is nonetheless known that certain unscrupulous consumers, on occasion, engage in the practice of "ticket switching" wherein the price tag for a low-priced item is switched with the price tag for a desired high-priced item using the plastic fastener from either the low-priced or the high-priced item. Various approaches to this problem have been devised, including the implementation of tamper-resistant plastic fasteners.

Although unrelated to the use of plastic fasteners, another common problem suffered by merchants is the theft of their merchandise. One approach that has been adopted by many merchants is the attachment of theft-detection devices, such as electronic article surveillance (EAS) markers, to their articles of commerce. Such devices, which are typically quite large and conspicuous in appearance, include an activating device such as a magnet, a pair of elongated strips of magnetizable material, a miniature electronic circuit, a radio frequency transmitter/receiver or the like which may be releasably attached to the article. The activating device is constructed so as to cause an audible signal or alarm to be emitted from a detector if the article is moved past the detector.

As an example of one type of EAS device, there is disclosed in U.S. Pat. No. 4,745,401 to Montean a marker for use in radio frequency electronic article surveillance systems where the marker contains an inductive-capacitive resonant circuit and is made reversibly deactivatable and reactivatable by the addition of a piece of magnetic material and means, such as a piece of permanently magnetizable material, for biasing the first material to prevent alternating fields induced therein from changing the magnetic state of that material, thereby preventing hysteresis losses from causing a lowering of the Q of the resonant circuit below the point of detection.

As an example of another type of EAS device, there is disclosed in U.S. Pat. No. 5,357,240 to Sanford et al an electronic article surveillance (EAS) tag comprising a tag body having a central region, side wall regions connected to and integral with the central region and flap regions connected to and integral with the side wall regions. The tag body has fold lines at the junctions of the side wall regions and the flap regions. By folding the tag body along these fold lines and, in the course of the folding procedure, inserting a first magnetic element, a substantially closed box-like housing with the first magnetic element loosely housed therein is formed.

SUMMARY OF THE INVENTION

It is an object of the present invention to provide a device for use in detecting the unauthorized removal of an article of commerce from a store or other business establishment.

It is another object of the present invention to provide a method for making such a device.

Accordingly, there is provided a fastener assembly for use in tagging an article of commerce, said fastener assembly comprising a plastic fastener comprising an elongated filament having a first end and a second end, a transverse bar disposed at the first end of the elongated filament and a paddle disposed at the second end of the elongated filament, the paddle having a recess, and a security device disposed within the recess of the paddle.

According to another aspect of the invention, there is provided a method of manufacturing a fastener assembly, comprising the steps of providing a plastic fastener having a recess, disposing a security device within the recess of the plastic fastener, and mounting a cover over the recess so as to trap the security device within the fastener.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitutes a part of this specification, illustrate an embodiment of the invention and, together with the description, serve to explain the principles of the invention. In the drawings wherein like reference numerals represent like parts:

FIG. 1 is an enlarged top view of a fastener assembly constructed according to the teachings of the present invention;

FIG. 2 is a front, section view of the fastener assembly shown in FIG. 1 taken along lines 2—2;

DETAILED DESCRIPTION OF A PREFERRED EMBODIMENT

Figure 3:
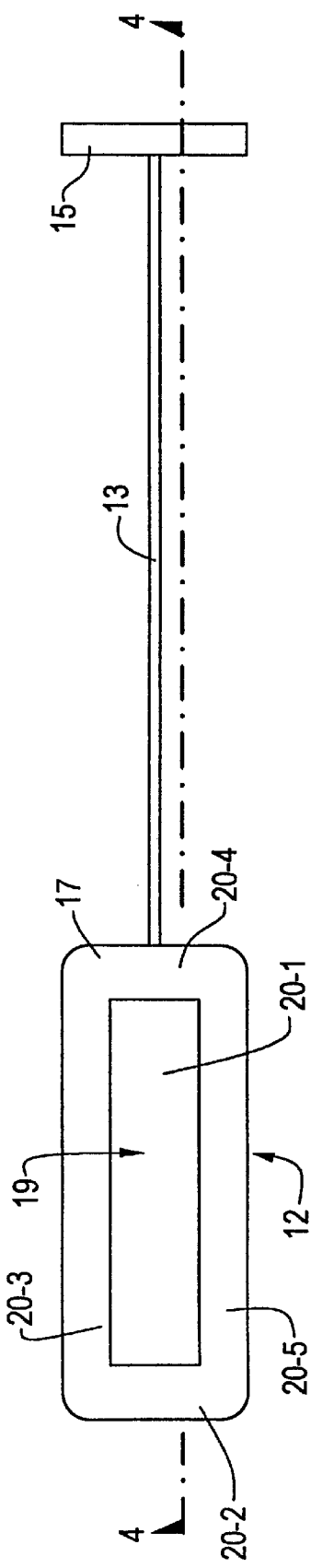
FIG. 3 is an enlarged top view of the fastener of the fastener assembly shown in FIG. 1.

Referring now to FIGS. 1 and 2, there are shown enlarged top and front views, respectively, of a fastener assembly constructed according to the teachings of the present invention, the fastener assembly being represented generally by reference numeral 11.

Fastener assembly 11 comprises a fastener 12 generally of the type which is commonly used to attach a tag to an article of clothing. Fastener 12 is preferably constructed of a plastic material such as polypropylene or nylon through molding techniques which will be described in detail below.

Figure 4:
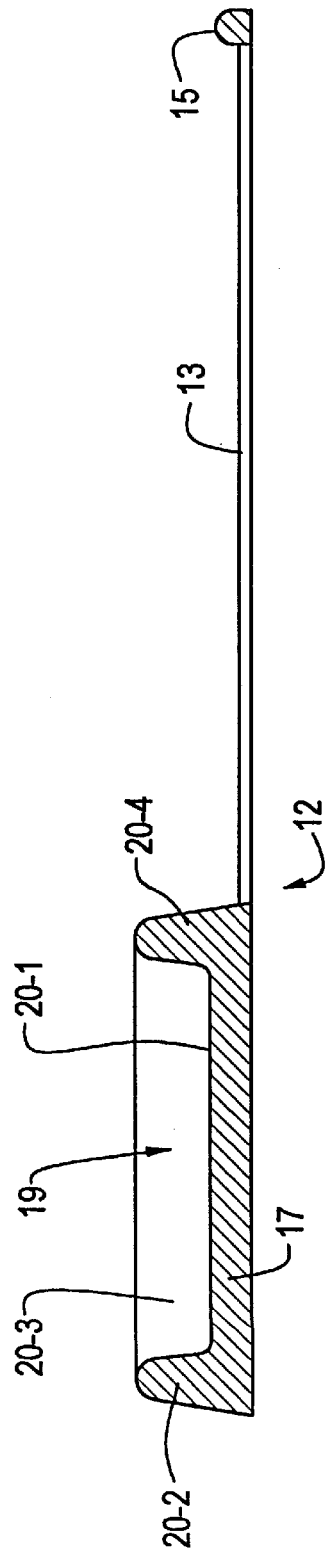
FIG. 4 is a front, section view of the fastener shown in FIG. 3 taken along lines 3—3.

As shown in FIGS. 3 and 4, fastener 12 is an elongated unitary plastic member shaped to define a thin, flexible filament 13, a transverse cross-bar 15 and an enlarged paddle 17, thin filament 13 interconnecting cross-bar 15 to paddle 17.

Cross-bar 15 is connected at its approximate midpoint to one end of thin filament 13 to form a T-shaped configuration and is appropriately sized and shaped to be dispensed through an article of clothing using a tagger gun having a hollow slotted needle. Although cross-bar 15 is shown as having a cross-section which is semicircular in shape, it is to be understood that the cross-section of cross-bar 15 could be of alternative shapes, such as circular or ovaloid, without departing from the spirit of the present invention.

Paddle 17 is connected to the opposite end of thin filament 13 and is appropriately sized and shaped to prevent flexible filament 13 from being pulled completely through the article of clothing through which cross-bar 15 has previously been inserted. Enlarged paddle 17 is generally rectangular in shape and includes a rectangular recess 19 having an open top. Recess 19 is defined by a bottom wall 20-1 and four sidewalls 20-2, 20-3, 20-4 and 20-5.

Fastener assembly 11 further comprises a security device 21 disposed within recess 19 of fastener 12 which detects against the unauthorized removal of the article of clothing to which fastener assembly 11 is attached from a store or other business establishment. Security device 21 is positioned on top of bottom wall 20-1 and held within recess 19 of paddle 17 by a cover 23 which is mountable over recess 19. Cover 23 is constructed of any material suitable for trapping device 21 within recess 19, such as a sealing laminate or a piece of adhesive-backed paper.

Security device 21 may be any well known electronic article surveillance (EAS) tag or marker which is commonly used to prevent shoplifting and similar unauthorized removal of articles from a controlled area. For example, security device 21 may comprise an activating device such as a magnet, an elongated strip of magnetizable material, a miniature electronic circuit or a radio frequency (RF) transmitter/receiver or the like. Security device 21 can be any EAS tag which is small enough to be disposed within fastener 13.

Security device 21 can be, but is not limited to, EAS tags which make use of electromagnetic fields to prevent shoplifting and similar unauthorized removal of articles from a controlled area. Electromagnetic EAS tags are well-known in the art and typically comprise at least one strip of magnetic material enclosed within a plastic container. In use, the magnetic material produces detectable harmonic frequencies in response to an interrogation signal. Examples of electromagnetic EAS tags of this type are disclosed in U.S. Pat. No. 5,357,240 to Sanford et al, U.S. Pat. No. 5,313,192 to Ho et al, U.S. Pat. No. 4,622,543 to Anderson, III et al, U.S. Pat. No. 4,510,490 to Anderson, III et al and U.S. Pat. No. 4,510,489 to Anderson, III et al, all of which are incorporated by reference. Electromagnetic EAS tags of the type described above may include an active marker (a marker which is detected only when magnetized) or a passive marker (a marker which is detected only when demagnetized). Furthermore, electromagnetic EAS tags of the type described above may be of the type which can be readily activated and deactivated.

It is to be understood that for the purposes of the present invention, the security device 21 disposed within recess 19 can be either an entire electromagnetic EAS tag of the type described above or simply one or more of its component parts, such as a single elongated strip of magnetizable material.

It is also to be understood that security device 21 is not limited to electromagnetic EAS tags. Rather alternative EAS tags may be disposed within recess 19 of fastener 12. For example, security device 21 may be of the type that makes use of radio frequency signals, such as an inductive-capacitance resonant circuit of the type disclosed in U.S. Pat. No. 4,745,401 to Montean, which is incorporated herein by reference.

Figure 5:
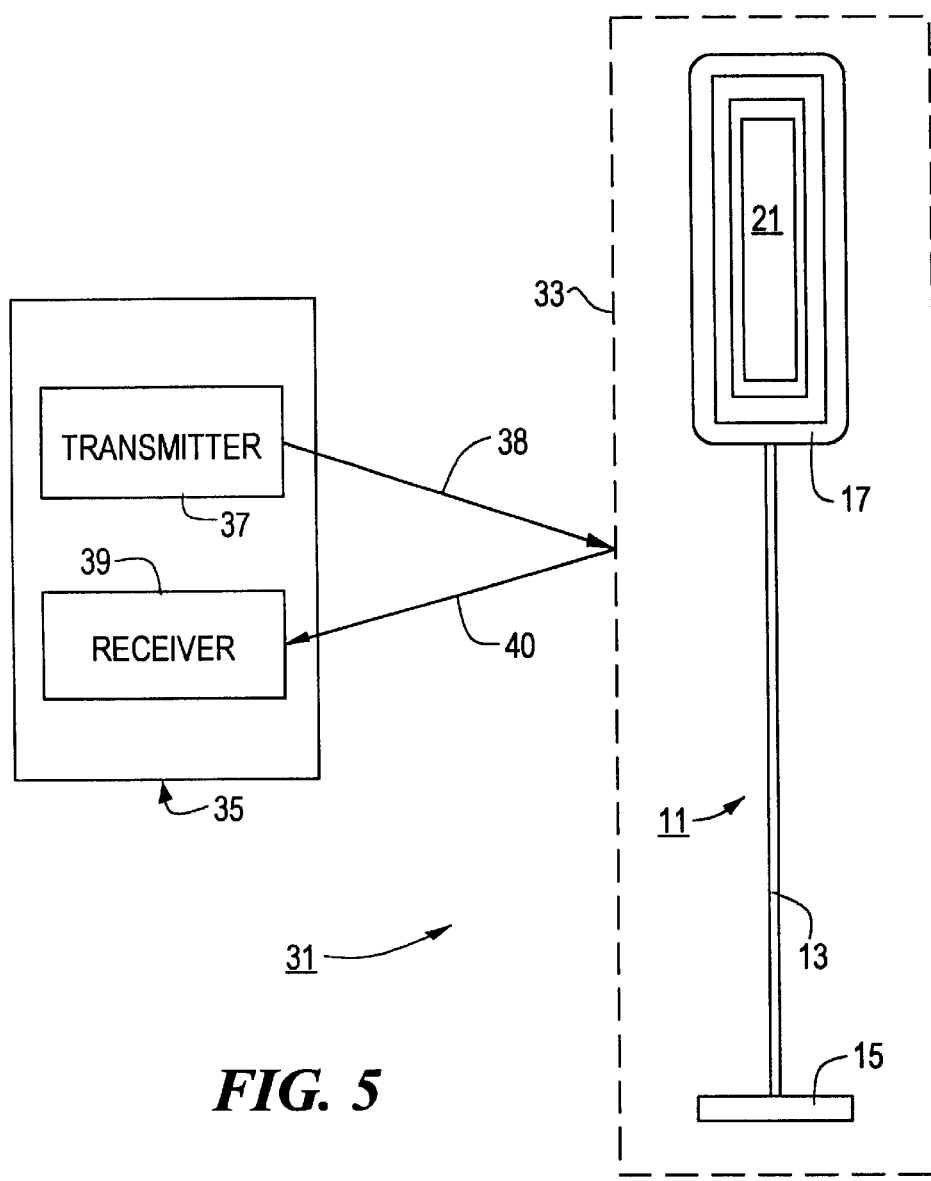
FIG. 5 is an electronic article surveillance (EAS) system constructed according to the teachings of the present invention, the EAS system being shown with the fastener assembly shown in FIG. 1.

Referring now to FIG. 5, fastener assembly 11 can be used in an electronic article surveillance (EAS) system 31 in the following manner. For simplicity, the present discussion of EAS system 31 is limited to a fastener assembly 11 which comprises an EAS security device 21 which is made of an electromagnetic material. However, it is to be understood that system 31 could be used in conjunction with fasteners having the numerous alternative types of security devices noted above.

Using well-known techniques, security device 21 is activated to produce an electromagnetic field 33 of a predetermined frequency about fastener assembly 11. Fastener assembly 11 is then secured to a desired article of clothing (not shown) by inserting cross-bar 13 through the article. Preferably a tagger gun is used to insert cross-bar 13 through the article.

A magnetic field sensor 35, which is commonly located at the egress of the room where the article is located or in the aisleway adjacent to the cashier or check out station, comprises electronic article surveillance (EAS) system components of known type. For example, sensor 35 comprises a transmitter 37 and a receiver 39. Although transmitter 37 and receiver 39 are shown as being housed within a single sensor 35, it is to be understood that transmitter 37 and receiver 39 could be housed within separate units.

Transmitter 37 of magnetic field sensor 35 produces a constant interrogation signal 38 at a particular frequency. Once security device 21 of fastener assembly 11 is brought in close proximity to transmitter 37, electromagnetic field 33 produced by security device 21 will create a reradiation signal 40 of interrogation signal 38, signal 40 having a different frequency than signal 38. Reradiation signal 40 of interrogation signal 38 is subsequently detected by receiver 39 which indicates that security device 21 has not been removed or deactivated by the cashier, and that the article bearing fastener assembly 11 may not have been paid for or properly checked out. Upon detecting reradiation signal 40, receiver 39 may cause sensor 35 to emit a visual and/or audio signal to notify of the potential theft of the article. To preclude sensor 35 from activating the alarm, such as if removal of the article is authorized, security 21 can be of the type which can be readily deactivated, such as by using a large magnetizable device which alters electromagnetic field 33 produced by tag 21, so as to prevent it from triggering magnetic field sensor 35.

It should be noted that although security device 21 is shown in FIGS. 1 and 2 as being mounted within paddle 17 of fastener 12, security device 21 could alternatively be located in any other portion of fastener 12, such as in filament 13 or in cross-bar 15 without departing from the spirit of the present invention.

Figure 6:
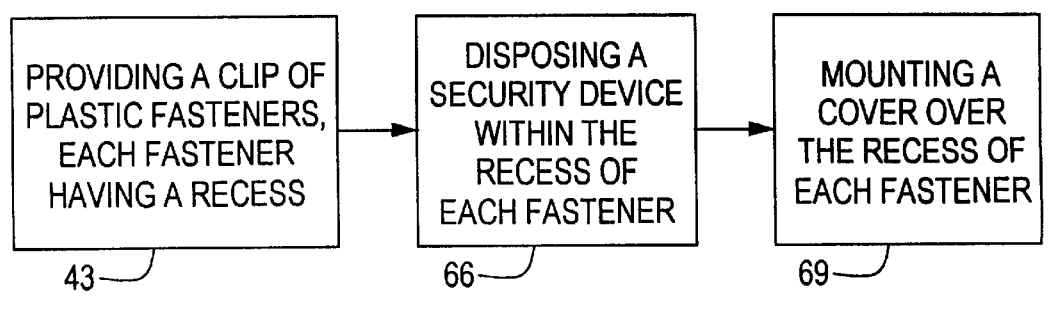
FIG. 6 is a block diagram of a method of manufacturing a plurality of fastener assemblies of the type shown in FIG. 1.

Referring now to FIG. 6, there is shown a block diagram for a method of constructing a plurality of fastener assemblies 11, the method being represented generally by reference numeral 41. In the preferred embodiment, method 41 is used to construct a plurality of fastener assemblies 11 of the type as described above. However, it is to be understood that method 41 is not limited to the construction of fastener assemblies having the same size and shape as fastener 12.

Method 41 comprises the following steps. First, a plurality of plastic fasteners 12 are manufactured through a process of continuous molding as indicated by block 43. Process 43 of continuously molding a supply of plastic fastener stock is well known in the art and may be, for example, of the type disclosed in U.S. Pat. No. 4,461,738 to Russel, which is herein incorporated by reference.

Figure 7:
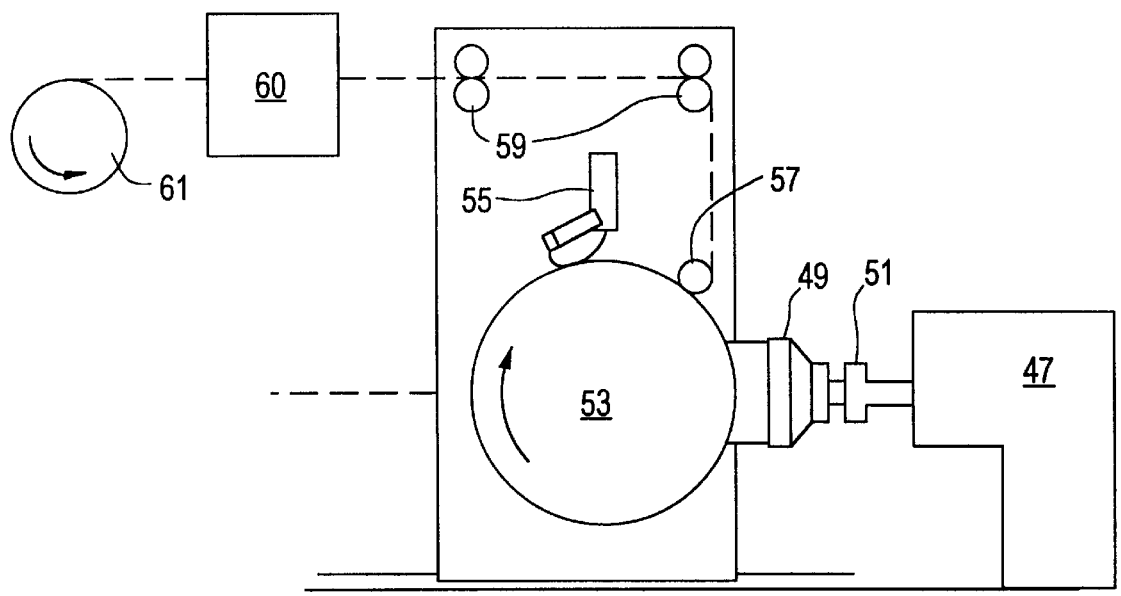
FIG. 7 is a schematic view of an apparatus which can be used to perform the step of providing a clip of plastic fasteners shown in FIG. 6.

Process 43 of continuously molding fastener stock may be accomplished using a continuous molding apparatus 45 of the type shown in FIG. 7. Continuous molding apparatus 45 comprises an extruder 47, a manifold assembly (also commonly referred to as an extrusion die) 49, a manifold mount 51, a rotatable molding wheel 53, a skiving knife and hold-down assembly 55, a take-off roll 57, transfer rolls 59 and a windup roll 61.

Figure 8:
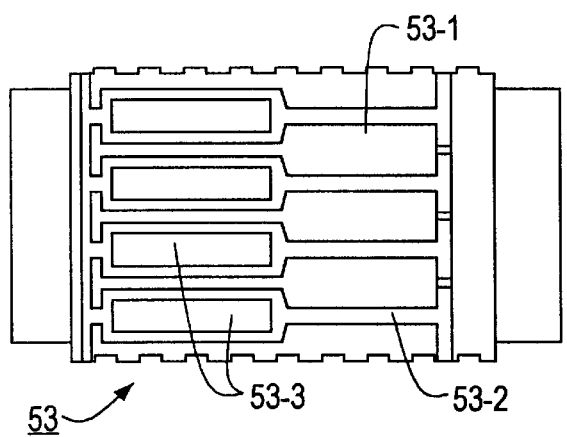
FIG. 8 is a surface view of the wheel in the apparatus shown in FIG. 7.

In use, continuous molding apparatus 45 produces a plurality of plastic fasteners in the following manner. Heated plastic is extruded from extruder 47 through orifices in manifold assembly 49 and into cavities in the periphery of rotating molding wheel 53. The plastic is any thermoplastic such as polypropylene. As shown in FIG. 8, molding wheel 53 has a top surface 53-1, a cavity 53-2 in the shape of fasteners 12 and a plurality of rectangular projections 53-3 which protrude up from the bottom surface of cavity 53-2 to a level below the surface of top surface 53-1. After the heated plastic in cavity 53-2 cools, excess is skived by assembly 55. The continuously molded fastener stock is then removed from wheel 53 by take-off roll 57 and transfer roll 59, stretched if desired by a stretching apparatus 60, and wound onto windup roll 61. FIGS. 3 and 4, show top and front views, respectively, of one fastener 12 in the fastener stock at this point in method 41. It should be noted that projection 53-3 on wheel 53 serves to produce rectangular recess 19 in paddle 17 of fastener 12.

Figure 9:
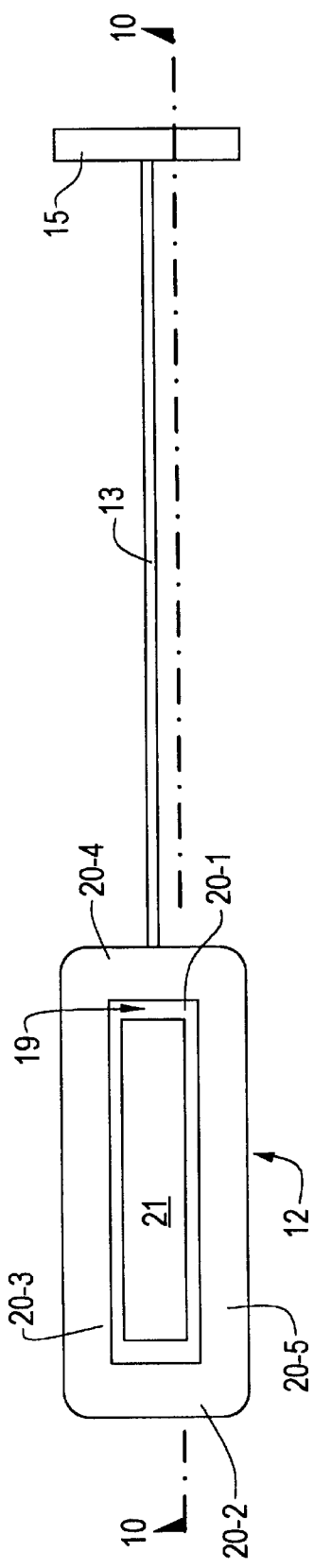
FIG. 9 is an enlarged top view of the fastener assembly shown in FIG. 1, the fastener assembly being shown without its cover.
Figure 10:
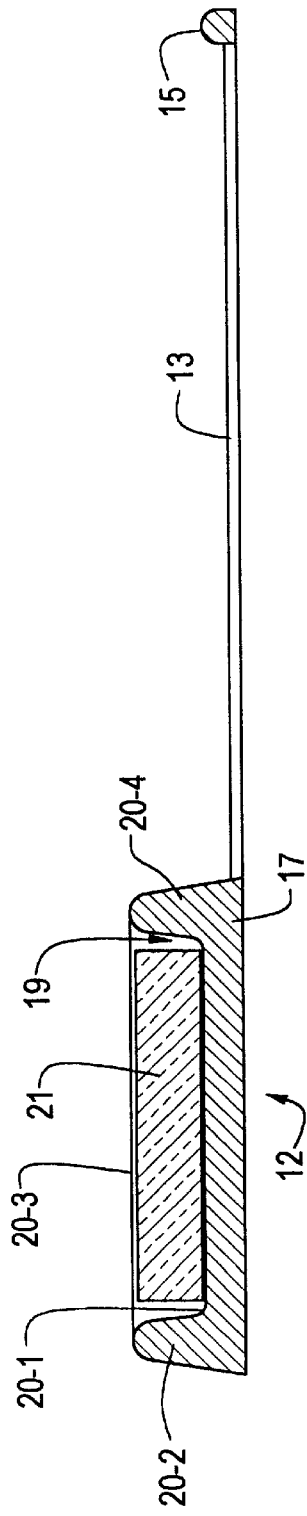
FIG. 10 is a front, section view of the fastener assembly shown in FIG. 9 taken along lines 10—10.

In the second step of method 41, a security device 21 is disposed within recess 19 of each fastener 12 in the fastener stock, the step being indicated by block 66 in FIG. 4. FIGS. 9 and 10, show top and front views, respectively, of fastener 12 at this point in method 41.

In the third step of method 41, cover 23 is mounted over recess 19 of each fastener 12 in the fastener stock to produce a plurality of fastener assemblies 11.

The embodiment of the present invention described above is intended to be merely exemplary and those skilled in the art shall be able to make numerous variations and modifications to it without departing from the spirit of the present invention. For example, rather than continuously molding a plastic fastener which has a recess formed in its paddle, a plastic fastener of uniform thickness could be produced and then stamped in an additional step to create a plastic fastener which has a recess into which the security device can be placed. Similarly, a plastic fastener of uniform thickness could be punched in an additional step to create a plastic fastener having a hole extending therethrough into which the security device can be placed, the security device being trapped within the fastener by a pair of covers. All such variations and modifications are intended to be within the scope of the present invention as defined in the appended claims.

What is claimed is:

1. A fastener assembly for use in tagging an article of commerce, said fastener assembly comprising:
    a) a plastic fastener comprising an elongated filament having a first end and a second end, a transverse bar disposed at the first end of the elongated filament and a paddle disposed at the second end of the elongated filament, said plastic fastener including a recess having an open top; and
    b) an EAS security tag disposed within the recess in said plastic fastener.

* * * * *